June 4, 1968 R. G. BROWN 3,386,370
TYING MACHINE FOR MAKING PARALLEL TIES
Filed Sept. 7, 1966 4 Sheets-Sheet 1

INVENTOR
Robert G. Brown
by Horton, Davis,
Brewer & Brugman
Att'ys

June 4, 1968   R. G. BROWN   3,386,370
TYING MACHINE FOR MAKING PARALLEL TIES
Filed Sept. 7, 1966   4 Sheets-Sheet 2

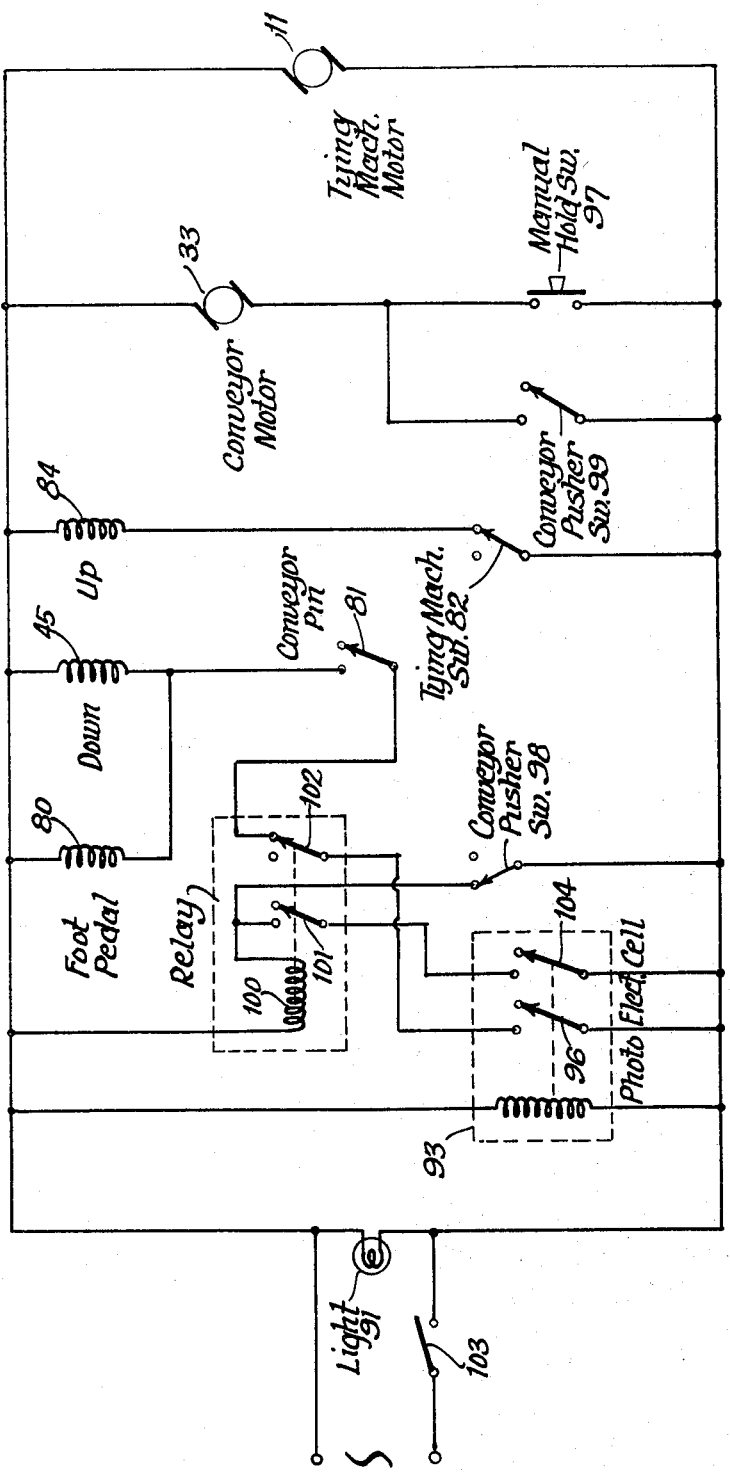

United States Patent Office 3,386,370
Patented June 4, 1968

3,386,370
TYING MACHINE FOR MAKING PARALLEL TIES
Robert G. Brown, Washington, D.C., assignor to B. H.
Bunn Company, Chicago, Ill., a corporation of Illinois
Filed Sept. 7, 1966, Ser. No. 577,718
12 Claims. (Cl. 100—4)

ABSTRACT OF THE DISCLOSURE

A tying machine for meat rolls or the like comprising an intermittently driven conveyor for advancing rolled meat toward a tying machine, with electrically interlocked controls for the conveyor and tying machine by which the conveyor and tying machine are alternately operable until the entire rolled meat is tied.

---

This invention relates to apparatus for tying closely spaced parallel ties around a product. For purposes of illustration it will be described as an attachment to a commercially available tying machine adapted for tying up rolled meats or the like.

There is presently commercially available a package-tying machine designed for tying meat rolls wherein the meat is held by the operator in its rolled state and advanced into the tying machine approximately one inch at a time after each tie is made by the machine. The machine is started by the operator in its tying cycle for each tie and the machine is stopped automatically at the end of each tie. Thus an operator must stand at the machine for the entire time that a meat roll is being tied.

Attempts have been made to eliminate the operator, except to initiate the tying operation and to have the machine perform the series of tying operations automatically and without manual intervention. Such attempts have been based upon the use of complex mechanisms which were costly and difficult to maintain in good, clean, sanitary condition.

It is an object of this invention to provide a package-tying device suitable for tying meat rolls, or the like, wherein the device is in the form of a simple attachment to a commercially available tying machine.

As a more detailed object, this invention has within its purview the provision of a simple means for intermittently advancing a meat roll, or the like, into a tying machine for tying a series of spaced parallel ties thereon.

Yet another detailed object of this invention is the provision of a meat roll advancing attachment for a meat roll tying machine wherein the components of the attachment, with the exception of the sheet metal parts, are standard, readily available parts, for low initial cost and for ease of maintenance.

A further detailed object of this invention is the provision of electrically controlled means for performing the functions of cyclicly advancing, holding and tying an article and of terminating these functions with the appropriate safeguards against an unwanted performance of these functions.

These and other objects of this invention will become apparent from the following detailed description of a preferred embodiment when taken together with the accompanying drawings in which FIG. 1 is a side elevational view of the attachment as applied to a standard meat roll tying machine;

FIG. 9 is a wiring diagram of the controls for the tying machine and attachment.

Figure 1:
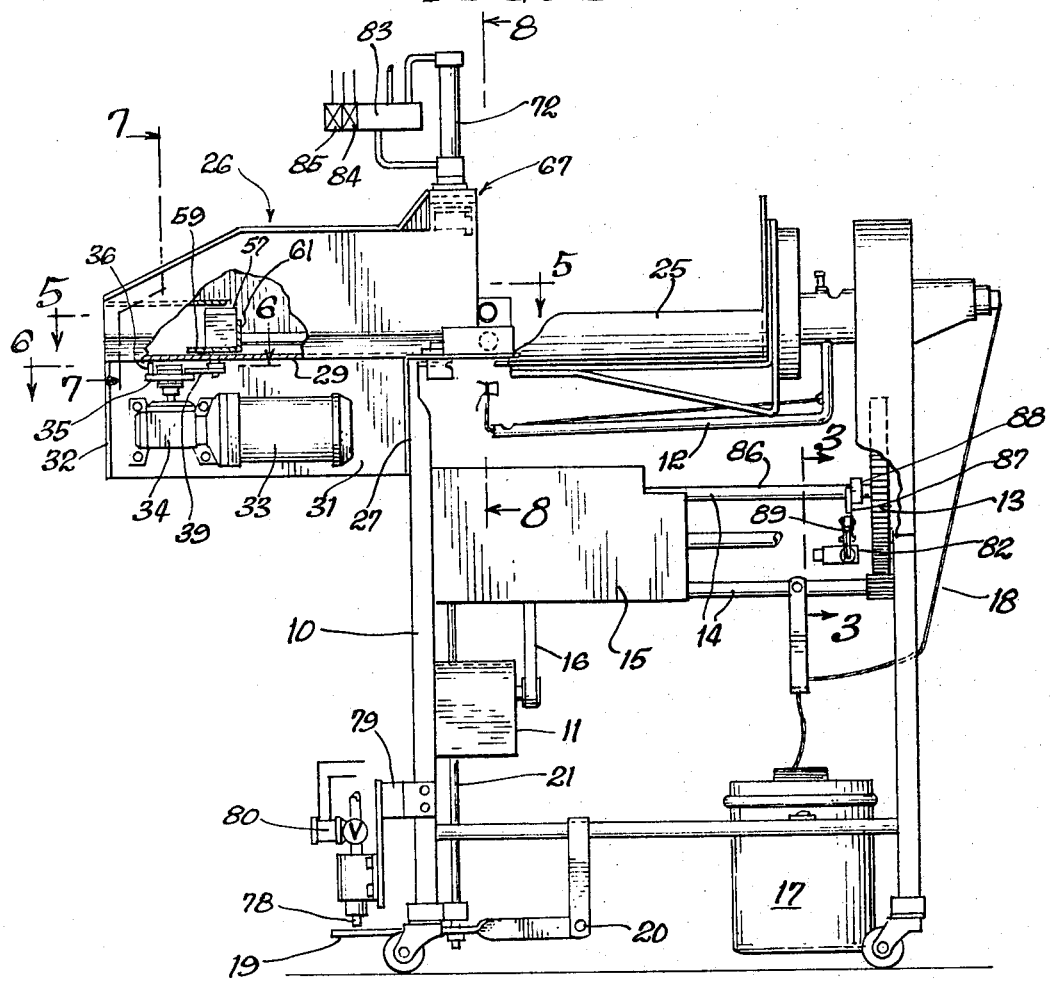

By way of general description, the attachment of this invention comprises an assembly which is adapted to be bolted to the frame of a standard tying machine of the type known as a meat roll model of a package-tying machine made by the B. H. Bunn Company of Chicago, Ill. The attachment includes a sheet metal framework which incorporates a trough in which the meat roll is received, a meat compactor operated by an air cylinder and reciprocable toward and away from the top of the meat roll to compact the roll against the bottom of the trough, and a conveyor of the endless chain type having two pusher arms equally spaced along the chain so that when one arm is behind a meat roll for pushing the roll into the tyer the other arm is returning from the front of the attachment. The conveyor is advanced intermittently in increments of predetermined length which may be equal to one inch, for example, by a continuously operating geared motor through a pin clutch operating an oscillating one-way clutch or ratchet. An optical device of the "electric eye" variety senses the presence of a meat roll in a starting position in the device and initiates the operation of the tying cycle. The meat clamping and holding cylinder is raised as a function of the operation of the tying machine and lowered as a function of the operation of the conveyor-advancing mechanism. The tying machine operation is initiated by an electrically controlled air cylinder which is secured to the frame of the tying machine over the standard treadle of the machine and serves to operate the treadle when the meat clamping device is in operation. The tying cycle and meat roll advancing cycle continue automatically until the meat roll has been pushed beyond the beam of the optical device whereupon the entire mechanism is halted.

Referring now to the drawings for a detailed description of the invention, the standard meat roll tying machine is comprised of a frame 10 on which is mounted a motor 11 for powering the twine arm 12 of the machine through appropriate gearing 13, shafting 14, clutch and interrupted gear mechanism 15, and a belt 16 driven by motor 11, all of said devices being shown schematically. A twine container 17 is also mounted on frame 10 and supplies twine 18 to arm 12 by which the twine is wrapped around the article to be tied. A pedal 19 pivoted at 20 to a portion of the frame 10 operates a reciprocating rod 21 which controls the engagement and disengagement of the clutch (not shown) for driving shafting 14.

All the devices 10 to 20 inclusive, as stated above, are known in the prior art and are shown in B. H. Bunn, Patent 2,366,235, dated Jan. 2, 1945.

Figure 2:
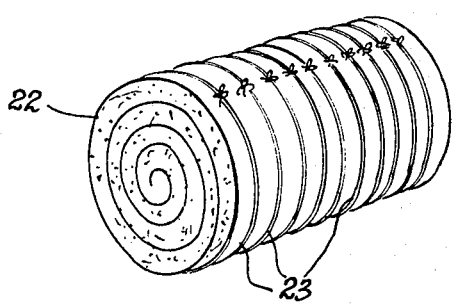
FIG. 2 is a perspective view of a meat roll which has been tied with a series of parallel ties in the desired manner by the device of FIG. 1.

The object to be tied is shown in FIG. 2, and in the form illustrated, is a roll 22 of meat which has been de-boned and to which it is desired to give a cylindrical form for better roasting and carving. The roll 22 is made to maintain its shape by a series of individual ties 23 which may have any desired spacing but which, for convenience, may be taken as approximately one inch. Each tie thus represents a single reach of twine tied and knotted to hold a small section of the meat together in the desired shape.

Figure 4:
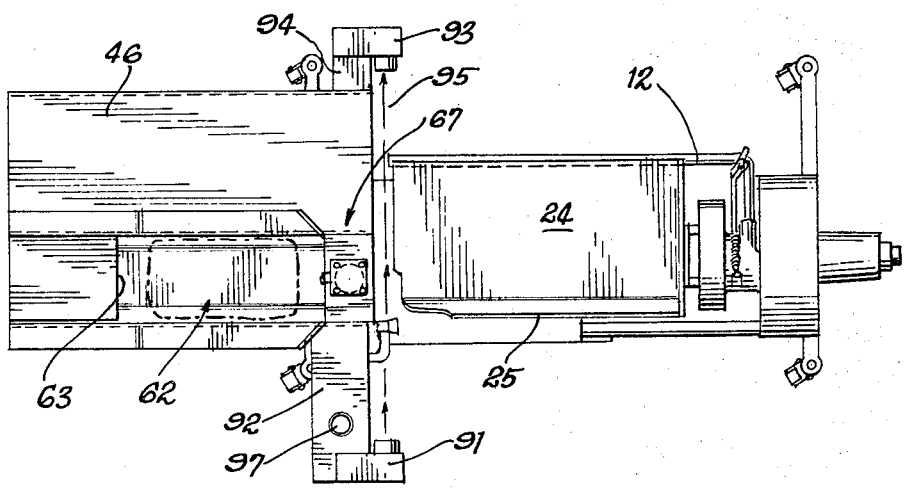
FIG. 4 is a plan view of the meat tyer attachment and the table of the tying machine.

Referring now to FIG. 4, the tying machine has a roll-supporting pivoted table 24 which is provided with an upstanding side 25 to retain the roll on the table. In place of the stationary table normally furnished with the tying machine in front of table 24, however, the meat roll forming and advancing mechanism of this invention is used. Said mechanism is designated in FIG. 1 generally by the reference character 26 and is constructed as a unitary device from stainless steel plates bolted or welded together. One such plate 27, disposed in a vertical plane transversely of frame 10, is secured to said frame by a plurality of bolts 28 and provides the means by which said mechanism 26 is supported by frame 10. A horizontal plate 29 serves as a base plate for mechanism 26, and to said horizontal plate 29 are secured side plates 30, 31 and a rear plate 32 (FIG. 1) to form a chamber for an electric motor 33 which is mounted on side plate 31. Said motor is provided with a reduction gear 34 the output of which drives a disc 35 (FIGS. 1 and 6) about a vertical axis. A vertically extending pin 36 is secured to disc 35 and serves as a source for intermittently driving a pusher type conveyor for advancing meat to the tying machine.

Figure 6:
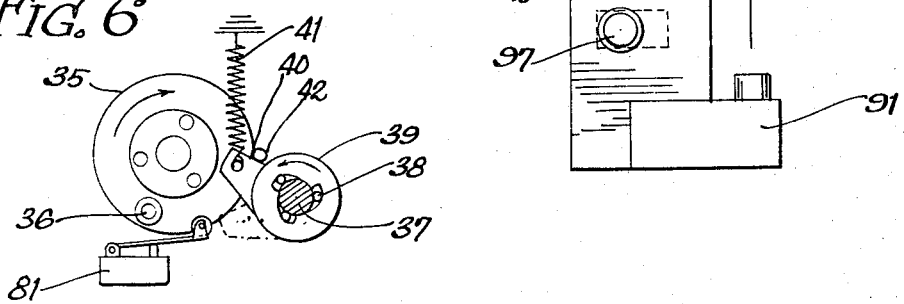
FIG. 6 is an enlarged fragmentary plan view of the drive mechanism for the article to be tied taken along line 6—6 of FIG. 1.

The intermittent drive itself is shown more clearly in FIG. 6. A vertically disposed conveyor drive shaft 37 is mounted on base plate 29 and around drive shaft 37 is arranged a one-way clutch 38 which may be of any known type, but is shown for illustrative purposes as being of the cam-and-roller type designed to produce a drive in shaft 37 in a counter-clockwise direction as viewed in FIG. 6. The cam or driving portion 39 of clutch 38 has an arm 40 extending radially outwardly from shaft 37 into the path of pin 36 on disc 35. Said disc 35 is driven in a clockwise direction as viewed in FIG. 6 so that for each revolution of disc 35, pin 36 strikes arm 40 and turns said arm and its driving clutch part 39 until said arm is no longer in the path of pin 36. A spring 41 returns arm 40 against a stop 42 in position to be engaged again by pin 36 on its next revolution with disc 35.

Figure 5:
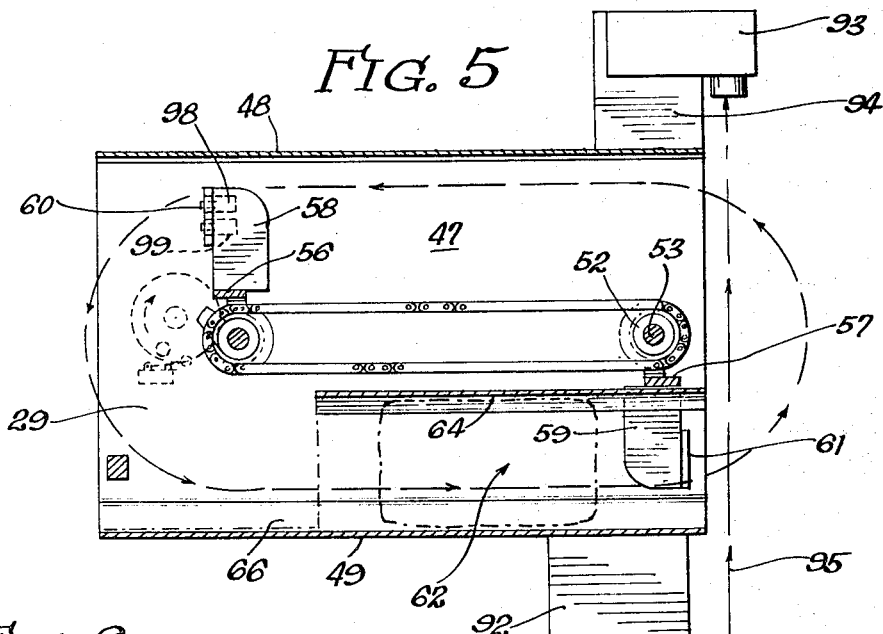
FIG. 5 is an enlarged plan view in section of the article-advancing means, the section being taken along line 5—5 of FIG. 1.
Figure 7:
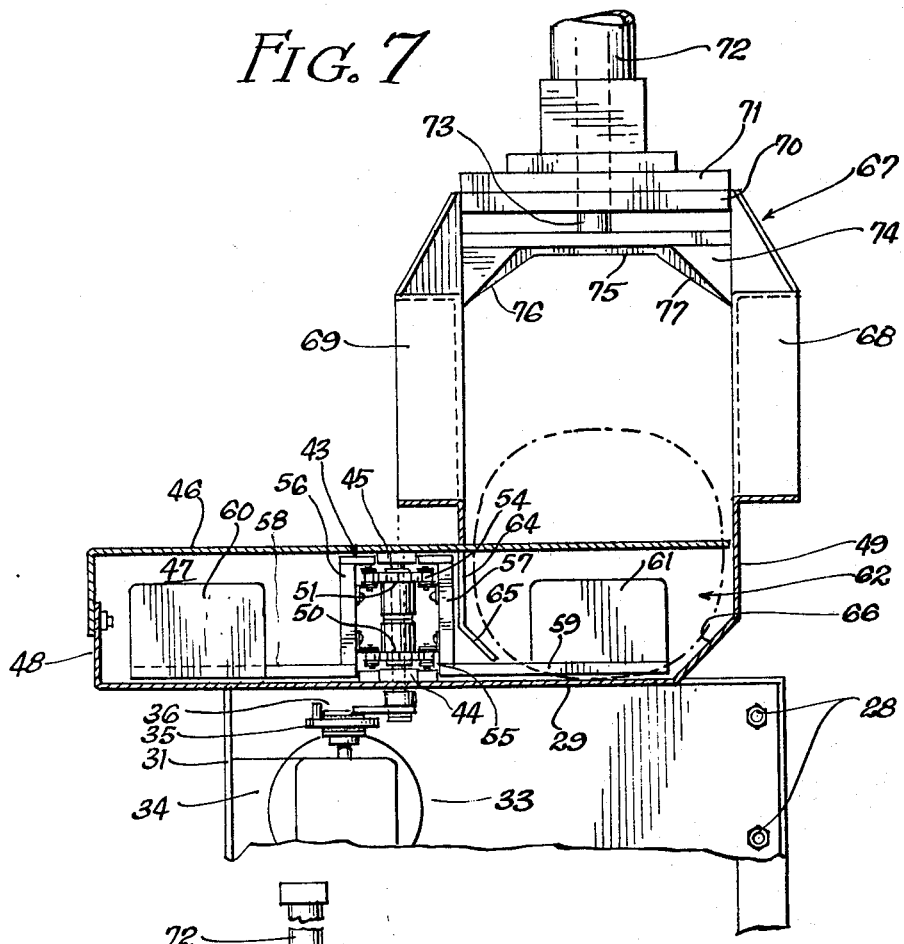
FIG. 7 is an enlarged front elevational view of a fragment of the attachment taken along line 7—7 of FIG. 1.

The pusher type conveyor is shown in FIGS. 5 and 7 and is designated generally by reference character 43. In the form illustrated, it is of the continuous, roller chain type and moves in a horizontal path, but it can take other forms and move in other than a horizontal path. Thus conveyor drive shaft 37 extends upwardly through appropriate bearings 44, 45 secured respectively to base plate 29 and to a cover plate 46 spaced from base plate 29 to form a conveyor chamber 47. Suitable vertical walls for chamber 47 are formed by laterally spaced plates 48, 49, the former of which may be comprised of flanges on base plate 29 and cover plate 46 secured together by separable fasteners to make cover plate 46 removable for access to chamber 47.

Conveyor shaft 37 drives a pair of vertically spaced sprockets 50, 51, and similar sprockets, only one of which, 52, is visible in FIG. 5, are mounted on an idler shaft 53 located in the forward end of chamber 47. Upper and lower endless roller chains 54 and 55, respectively, are retained on sprockets 51 and 50 and on the idler sprockets, and are adapted to be driven in the direction of the arrows in FIG. 5.

Attached to both chains 54 and 55 at equally spaced intervals along the chains are two bars 56 and 57, the mode of attachment being such as to inhibit turning of the bars about their own axes. To the bottom of each bar is secured a horizontal stainless steel plate 58 and 59, respectively, each of which extends outwardly from the bar. A stainless steel vertical plate 60 and 61 is secured to the forward end of each horizontal plate and serves as the pusher for the meat to be tied.

The loading station for conveyor 43 is located near the forward end of the forward flight of the conveyor. This station is shown at 62 and is defined in part by an opening 63 (FIG. 4). The meat is prevented from contacting the chains of the conveyor by a stainless steel partition 64 which is secured to and depends from cover plate 46. The lower region 65 of partition 64 is spaced from base plate 29 to allow the horizontal plates 58, 59 to pass under partition 64, and the said lower region is furthermore bent toward the meat to give the latter support and at the same time to contribute to a more rounded initial shape thereof. The lower region 66 of the vertical plate 49 is similarly bent toward, and contributes to the rounded shape of the meat.

It may be apparent from the description thus far given, that the pushers 60 and 61 will be driven by the chains 54, 55, and that the chains will be driven by shaft 37 intermittently through the pin 36 and one-way clutch 38 from motor 33. The actual distance moved by each pusher is designed to be equal to the desired spacing between ties on the meat.

Figure 8:
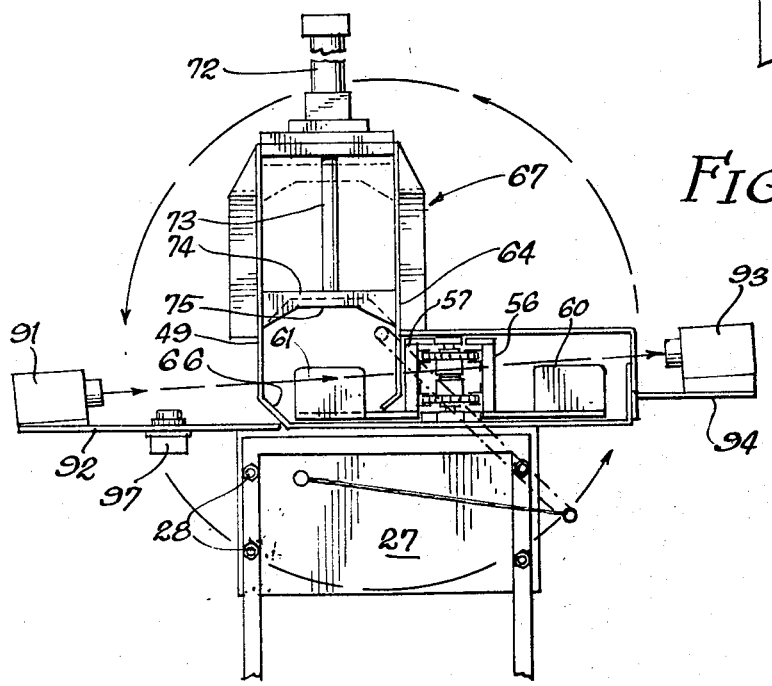
FIG. 8 is an enlarged rear elevational view in section of the attachment taken along line 8—8 of FIG. 1.

It is necessary to hold the meat firmly in place while it is being tied, and at the same time, to give the meat a generally round upper contour. The means for accomplishing the holddown and shaping functions is shown generally at 67 and includes the vertical walls 49 and 64 (FIGS. 7 and 8) which have stiffening flanges 68, 69, respectively, at their upper ends and which are connected at their tops by a pair of flanged plates 70, 71 superposed upon one another for stretch. Upon plate 71 is secured an air cylinder 72 of any known construction, the operative rod 73 of which extends through suitable openings in plates 70, 71 and is adapted to be reciprocated toward and away from the meat to be tied.

To the lower end of rod 73 is secured a clamp 74 preferably formed from stainless steel sheet and having a bottom, meat-engaging surface 75 the ends 76 and 77 of which are sloped downwardly to provide the desired generally round upper contour to the meat. It is contemplated that air cylinder 72 will be actuated to lower and press clamp 74 against the meat and remain in its lower position until a tie has been made, after which the clamp is raised to allow the meat to be advanced by conveyor 43 to the next tying position.

The operating devices and their controls by which a desired sequence of operations is effected automatically to tie a series of parallel ties around an article such as meat roll 22 will now be described. Those devices and controls which are not attached to, and an integral part of, the roll advancing mechanism 26 are arranged to be readily clamped to a standard trying machine adjacent the part thereof with which they are to function. One such operating device is an air operated plunger 78 (FIG. 1), which is mounted on a bracket 79 clamped to frame 10 in such manner as to cause said plunger to operate pedal 19 which initiates the operation of the tying machine. Said plunger is controlled by a solenoid-operated valve 80 which, in turn, is controlled by a switch 81 (FIG. 6) actuated by pin 36 of the conveyor drive. Said solenoid-operated valve is returned by a spring so that as soon as the pin passes the switch, the latter is opened and the solenoid moves the valve to vent position. The tying machine is so constructed that the tying cycle proceeds automatically to completion once the pedal 19 is depressed.

Figure 3:
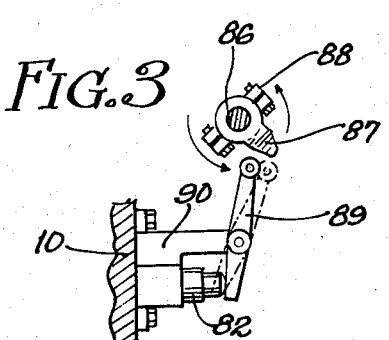
FIG. 3 is an enlarged view of a control switch-operating device added to the standard tying machine of FIG. 1, the view being taken along line 3—3 of FIG. 1.

A switch controlled by an operating device on the tying machine is shown in FIGS. 1 and 3. The said switch 82 controls the hold-down cylinder 72 which is a double-acting cylinder with the usual four-way solenoid-operated valve 83 and separate controls for the down and return or up strokes. Switch 82 controls a solenoid 84 which shifts valve 83 to effect the up stroke of cylinder 72 to raise the clamp 74. Solenoid 85 is controlled by the same switch 81 which controls the operation of pedal 19, and shifts valve 83 to effect a down stroke of cylinder 72 to lower clamp 74 upon the meat. Switch 82 is secured to frame 10 at a location thereon in proximity to twine arm drive shaft 86. A cam 87 is formed on a split hub 88 which is clamped upon, and thus rotatable with, shaft 86.

Said cam 87 is adapted to contact and oscillate a rocker arm 89 pivoted on the base 90 on which switch 82 is mounted, said base and its switch 82 being secured to frame 10 as aforesaid. Rocker arm 89 operates switch 82.

The control for the meat roll advancing mechanism also includes a photo-electric sensing device which is used to prevent operation of the meat holding operation and the operation of the tying machine when no meat is present in the tying machine. This photoelectric sensing device is comprised of a light source 91 (FIGS. 5 and 8) mounted on an extension 92 of base plate 29, and a photo-electric pick-up device of well-known form 93 mounted on a platform 94 extending outwardly from the side of plate 48. Light source 91 is located to produce a beam of light 95 directed across and a short distance beyond the forward end of loading station 62. There are two switches associated with the photoelectric pick-up device one of which is shown in the wiring diagram of FIG. 9 at 96 and serves to close a circuit through both the solenoid 80 controlling operation of foot pedal 19 and the solenoid 45 controlling the downward movement of the meat clamp 74. When no meat or other product to be tied intercepts beam 95, solenoids 80 and 45 are inoperative.

It is contemplated that photo-electric cell controlled switch 96 will be held open until meat or other product intercepts beam 91. Said switch 96 must also be held open while vertical plate 60 or 61 of the conveyor is passing around the forward sprockets 52, not only to avoid a useless operation of the tying machine, but also to prevent possible interference between twine arm 12 and the pushers of the conveyor. The latter function is provided by a normally closed switch 98 (FIG. 5) which is disposed in the return flight of conveyor 43 under base plate 29 and is contacted and opened by the horizontal plate 58 or 59 of said conveyor 43. An adjacent normally closed switch 99, also opened by said plate 58 or 59, serves to interrupt the circuit to conveyor motor 33 and stop said conveyor when the meat or the like has been pushed out of the loading station and has been completely tied. Conveyor motor 33 is reactivated for the next meat roll by a manually switch 97 which by-passes conveyor-operated switch 99 and is held down until the conveyor bottom plate 58 or 59 has moved off switch 99 and allowed said switch to close.

The inhibiting of the operation of the foot pedal solenoid 80 and the hold-down valve solenoid 85 except when a meat roll is in tying position is accomplished through the intermediary of a latching relay 100 (FIG. 9) which is provided with two switches 101 and 102. Switch 102 is in series with switches 81 and 96 and in the inoperative condition of the relay, establishes a circuit through these switches to cause solenoids 80 and 45 to be energized when the light beam is interrupted and the pin 36 strikes switch 81. When pusher plate 58, for example, strikes switch 98, the opposite pusher plate 59 and vertical plate 61 intercept the light beam and operate photo-electric cell 93 just as though meat were in the loading station. At such time, however, relay 100 is pulled up, breaking the circuit to the solenoids 80 and 45 and at the same time making the latching contact 101 to hold the relay in operated condition. The latter circuit is completed through a second switch 104 operated by the photo-electric cell which remains operated as long as the conveyor pusher plates intercept the beam 95. When the pusher no longer intercepts beam 95, switch 104 is opened by the photo-electric cell and relay 100 is deenergized, thus closing switch 102 and completing the circuit through switch 102 in readiness for the next tying operation.

The operation of the device is as follows:

Because of the conveyor-operated switches 98 and 99, the device will come to rest with the pushers 60 and 61 in the positions shown in FIG. 5 and with the hold-down mechanism 67 in the raised condition. Assuming that the tying machine motor 11 is inoperative and that the machine as a whole is about to be used to tie its first meat roll, the first step is to turn on an on-off switch 103 to power the machine as a whole. This starts the operation of tying machine motor 11 which then runs continuously as long as switch 103 is on. It also turns on the light beam 91 which likewise remains on as long as switch 103 is on.

Next, a meat roll 22 is placed approximately in the position shown in dot-dash outline in the loading station 62 (FIGS. 4, 5) behind the conveyor pusher plates 59 and 61, under the hold-down clamp 74. At this stage, conveyor motor switch 99 is held open by the conveyor pusher plate 58, and hence, to start conveyor motor 33, the manual by-pass switch 97 is held down by the operator until pusher plate 58 has passed switch 99 and allowed it to close. Since plate 58 is hidden by cover plate 46, the operator watches instead the opposite pusher plate 59 until the latter has rounded sprocket 53. While the vertical plate 61 is rounding this sprocket, it is intercepting beam 91, but the clamp 74 will not be lowered because the release switch 104, also operated by the photo-electric cell, will be closed and will not allow relay 100 to be deenergized by conveyor-operated switch 98 which was opened at the same time that switch 99 was closed.

After plate 61 passes beyond beam 91, photo-electric cell switches 96 and 104 are open, relay 100 is deenergized and switch 102 is closed. With conveyor motor 33 running continuously, pin 36 driven by said motor operates one-way clutch 39, once for each revolution of disc 35, and hence shaft 37 and the associated sprockets, chains and pushers will be advanced intermittently until plate 60 strikes the meat roll 22. Thereafter, the roll will be advanced to the right as viewed in FIGS. 4 and 5 in approximately one-inch steps. Clamp 74 will not be lowered, however, nor will the foot pedal 19 be depressed to start the tying machine twine arm 12 rotating until the forward edge of the meat intercepts beam 91. When the latter occurs photo-electric cell switches 96 and 104 are closed and remain in this condition as long as the roll intercepts beam 91.

With switches 96 and 99 closed, and with relay 100 deenergized, the circuits through the foot pedal solenoid 80 and the down-solenoid 45 for lowering clamp 74 will be made periodically by the closing of switch 81 operated by pin 36 on plate 35. Thus, once for each revolution of plate 35, the foot pedal 19 will be depressed to start the twin arm 12 rotating to tie and knot a reach of twine around the meat roll, and simultaneously, the clamp 74 will be lowered upon the roll to hold it while it is being tied. Upon the completion of the tying operation for each tie 23, switch 82 will be operated by the final stages of the cycle of the tying machine and will energize the solenoid valve 84 to cause clamp 74 to be raised to allow the roll to be advanced another increment.

The cycling of switches 81 and 82 continues until the opposite pusher contacts switches 98 and 99. This stops conveyor motor 33 and hence stops the cycling of switch 81. Switch 82 is closed by the completion of the last tying cycle and hence clamp 74 is now held raised to allow the tied meat roll to be removed. Relay 100 is energized through switch 98 which is closed by the conveyor pusher plate, and when energized, closes contacts 101 and opens contacts 102. The interruption of beam 91 by the conveyor pusher plate causes switches 96 and 104 to remain closed, which then completes the latching circuit through switches 104 and 101, thus holding relay 100 energized even though the conveyor pusher plate 58 or 59 may be moved off switch 98. Relay switch 102 is opened by the energized relay so that neither the foot pedal nor the down solenoid for clamp 74 can be operated. At this stage, the device is ready for the next meat roll to be tied and a new cycle of successive, automatically effected ties to be made.

I claim:

1. The combination of a tying machine for tying a reach of twine around an article, said tying machine having a rotatable twine arm, means for driving said twine arm and a lever for initiating the operation of the twine arm driving means, means for supporting an article to be tied in proximity to said twine arm, electrically driven means for advancing the article intermittently toward the twine arm to effect a succession of spaced ties around said article, and control means for operating said lever and said article advancing means in alternating sequence, characterized in that said advancing means comprises an endless conveyor for advancing said article, a support for said conveyor, and means operated by said conveyor and disposed at a location on said support corresponding to the location of a completely tied article for stopping said conveyor.

2. The combination according to claim 1, characterized further by electromagnetically controlled means for clamping the article to the support and for operating the lever for initiating the operation of the twine arm driving means, and means operated in timed relation with the intermittent advancing means for controlling the said electromagnetically controlled means.

3. The combination according to claim 2 characterized further in the provision additionally of a light source adapted to project a beam of light across the path of the article as it advances toward the twine arm, and light sensitive switch means adapted to receive light from said beam of light and connected in series with the electrically driven means for intermittently advancing the article to deactivate said intermittent advancing means, whereby to interrupt the operation of the means for clamping the article and for operating said lever.

4. The combination according to claim 2, characterized further in the provision additionally of a light source adapted to project a beam of light across the path of the article as it advances toward the twine arm, and light sensitive switch means adapted to receive light from said beam of light and connected in series with the electrically driven means for intermittently advancing the article to deactivate said intermittent advancing means, whereby to interrupt the operation of the means for clamping the article and for operating said lever, and article pushers driven by said conveyor and adapted to move across said beam of light, a second light sensitive switch means adapted to receive light from said beam, and other switch means controlled jointly by said conveyor and by said second light sensitive switch means for interrupting the operation of the means for clamping the article and for operating said lever.

5. The combination according to claim 1, characterized in that said article advancing means comprises further an electric motor, a rotatable disc driven from said motor, a pin on the disc, a shaft, a sprocket on said shaft for driving said conveyor, an oscillatable member on said shaft and adapted to be contacted by said pin and turned in one direction thereby, resilient means continuously urging said oscillatable member in the opposite direction, and a one-way clutch connecting said oscillatable member and shaft for driving said shaft intermittently in said one direction.

6. The combination according to claim 5, characterized further by electromagnetically controlled means for clamping the article to the support and for operating the lever for initiating the operation of the twine arm driving means, and switch means operated by said pin for controlling the operation of said electrically controlled means.

7. The combination according to claim 1, characterized by removable means for securing said support for said advancing means to the tying machine.

8. The combination according to claim 1, characterized by readily removable means for securing said control means for operating said lever to the tying machine adjacent said lever.

9. The combination according to claim 1, characterized by means for clamping to the support the article to be tied, control means for the clamping means, a shaft in the tying machine rotating in timed relation to the twine arm, and split means secured to the said shaft and readily removable therefrom, for operating the control means for the clamping means.

10. The combination according to claim 1, characterized in that said conveyor for advancing the article comprises an endless chain, equally spaced upstanding plates secured to said chain for pushing an article to be tied, said chain having a forward flight and a return flight, and but one plate being in the forward flight at any one time.

11. The combination according to claim 1, characterized in that said means for supporting an article to be tied in proximity to said twine arm comprises a base plate, upstanding sides on said base plate, a vertical partition between said sides defining an article loading station on one side and a conveyor chamber on the other side, and a cover for said conveyor chamber, said partition extending downwardly from said cover toward said base plate to leave a slot therebetween, and said conveyor comprising vertically disposed pushers for the articles to be tied and horizontal supports for the pushers, one of said horizontal supports extending through the said slot from the conveyor chamber into the article loading station.

12. The combination according to claim 11, further characterized in that said means for supporting an article to be tied in proximity to the twine arm comprises additionally a vertical support secured to the base plate, and means for detachably securing said vertical support to said tying machine.

References Cited

UNITED STATES PATENTS

| | | | |
|---|---|---|---|
| 2,342,471 | 2/1944 | Jampol | 100—27 XR |
| 2,366,235 | 1/1945 | Bunn | 100—27 |
| 2,684,626 | 7/1954 | Eberle | 100—14 XR |
| 3,330,205 | 7/1967 | Smith | 100—14 XR |

BILLY J. WILHITE, *Primary Examiner.*